(12) United States Patent
Hong et al.

(10) Patent No.: US 9,003,022 B2
(45) Date of Patent: Apr. 7, 2015

(54) DETERMINING AN AVERAGE EFFECTIVE DATA THROUGH-PUT AS CORRESPONDS TO A NETWORK-SERVED END USER

(75) Inventors: Tengywe Eric Hong, Naperville, IL (US); Jagadeesh Dantuluri, Aurora, IL (US)

(73) Assignee: Zettics, Inc., Concord, MA (US)

( * ) Notice: Subject to any disclaimer, the term of this patent is extended or adjusted under 35 U.S.C. 154(b) by 0 days.

(21) Appl. No.: 13/393,153

(22) PCT Filed: Jun. 17, 2011

(86) PCT No.: PCT/US2011/040860
§ 371 (c)(1),
(2), (4) Date: Mar. 22, 2012

(87) PCT Pub. No.: WO2011/160002
PCT Pub. Date: Dec. 22, 2011

(65) Prior Publication Data
US 2012/0173719 A1 Jul. 5, 2012

Related U.S. Application Data

(60) Provisional application No. 61/355,625, filed on Jun. 17, 2010.

(51) Int. Cl.
*G06F 15/173* (2006.01)
*H04L 12/26* (2006.01)
*H04L 29/06* (2006.01)

(52) U.S. Cl.
CPC .......... *H04L 43/0888* (2013.01); *H04L 69/163* (2013.01); *H04L 69/28* (2013.01)

(58) Field of Classification Search
USPC ....................................................... 709/224
See application file for complete search history.

(56) References Cited

U.S. PATENT DOCUMENTS 6,006,264 A * 12/1999 Colby et al. .................. 709/226
6,256,300 B1 7/2001 Ahmed et al.
(Continued)

FOREIGN PATENT DOCUMENTS

EP 1111871 A2 6/2001
EP 1725006 A1 11/2006
(Continued)

OTHER PUBLICATIONS

International Search Report dated Dec. 16, 2011 for PCT/US2011/040860.
(Continued)

*Primary Examiner* — Kostas Katsikis
(74) *Attorney, Agent, or Firm* — Wilmer Cutler Pickering Hale and Dorr LLP

(57) ABSTRACT

A network monitoring apparatus in a communications network detects TCP data flows (to at least one network-served end user) to provide corresponding detected data flows. This apparatus then measures data throughput to this (or these) end user(s) via the TCP data flows and during the TCP data flows and calculates an average effective data throughput to this end user. This calculation can be based, by one approach, upon use of time variables that represent the detected data flows (to effectively garner a beginning-to-end view oft be various TCP data flows while avoiding inclusion of periods that represent no (or possibly only a little) volume in these regards as may be due to application idle time or end-user idle time while including periods that represent no (or possibly only a little) volume due to network buffering, device performance problems, and so forth).

17 Claims, 4 Drawing Sheets

(56) References Cited

U.S. PATENT DOCUMENTS

| | | |
|---|---|---|
| 6,292,166 B1 | 9/2001 | Palmer et al. |
| 6,654,373 B1 | 11/2003 | Maher, III et al. |
| 6,697,378 B1 | 2/2004 | Patel |
| 7,283,814 B2* | 10/2007 | Klein et al. ............... 455/419 |
| 2001/0041566 A1 | 11/2001 | Xanthos et al. |
| 2002/0009072 A1* | 1/2002 | Halme ...................... 370/352 |
| 2002/0027884 A1* | 3/2002 | Halme ...................... 370/253 |
| 2002/0174216 A1 | 11/2002 | Shorey et al. |
| 2002/0176378 A1 | 11/2002 | Hamilton et al. |
| 2003/0035420 A1* | 2/2003 | Niu ........................... 370/389 |
| 2003/0067897 A1 | 4/2003 | Black |
| 2004/0010585 A1* | 1/2004 | Jones et al. ............... 709/224 |
| 2004/0030770 A1 | 2/2004 | Pandya |
| 2004/0044761 A1* | 3/2004 | Phillipi et al. ............ 709/223 |
| 2004/0073655 A1 | 4/2004 | Kan et al. |
| 2004/0162994 A1 | 8/2004 | Cohen et al. |
| 2004/0218529 A1 | 11/2004 | Rodosek et al. |
| 2005/0117546 A1 | 6/2005 | Lioy et al. |
| 2005/0132062 A1* | 6/2005 | Halme ...................... 709/227 |
| 2005/0237942 A1 | 10/2005 | Lewis et al. |
| 2005/0262183 A1 | 11/2005 | Colrain et al. |
| 2005/0286432 A1 | 12/2005 | Yasuie et al. |
| 2006/0056300 A1 | 3/2006 | Tamura et al. |
| 2006/0126509 A1 | 6/2006 | Abi-Nassif et al. |
| 2006/0165029 A1* | 7/2006 | Melpignano et al. ......... 370/328 |
| 2006/0176809 A1 | 8/2006 | Lea et al. |
| 2006/0218264 A1 | 9/2006 | Ogawa et al. |
| 2007/0044142 A1 | 2/2007 | Yoon et al. |
| 2007/0086353 A1 | 4/2007 | Gefflaut et al. |
| 2007/0110000 A1* | 5/2007 | Abedi ....................... 370/332 |
| 2007/0211631 A1 | 9/2007 | Rahman et al. |
| 2007/0230413 A1 | 10/2007 | Gandhi et al. |
| 2008/0004035 A1 | 1/2008 | Atkins et al. |
| 2008/0005156 A1 | 1/2008 | Edwards et al. |
| 2008/0212487 A1 | 9/2008 | Silvestri et al. |
| 2008/0313328 A1* | 12/2008 | Dahlin et al. ............ 709/224 |
| 2009/0016226 A1 | 1/2009 | LaVigne et al. |
| 2009/0059792 A1* | 3/2009 | Itoh .......................... 370/235 |
| 2009/0116402 A1* | 5/2009 | Yamasaki ................. 370/253 |
| 2009/0129346 A1 | 5/2009 | Hong |
| 2010/0054123 A1 | 3/2010 | Yong |
| 2010/0290415 A1* | 11/2010 | Han et al. ................. 370/329 |
| 2011/0013569 A1 | 1/2011 | Scherzer et al. |
| 2011/0029632 A1 | 2/2011 | Siemens |
| 2011/0085461 A1* | 4/2011 | Liu et al. .................. 370/252 |
| 2011/0302235 A1* | 12/2011 | Monk et al. ............... 709/203 |
| 2012/0137019 A1 | 5/2012 | Kotecha et al. |
| 2012/0294231 A1 | 11/2012 | Finlow-Bates et al. |
| 2012/0314616 A1 | 12/2012 | Hong et al. |
| 2013/0064184 A1* | 3/2013 | Ishii .......................... 370/328 |
| 2013/0142038 A1* | 6/2013 | Pan et al. .................. 370/230 |

FOREIGN PATENT DOCUMENTS

| | | |
|---|---|---|
| WO | WO-03096729 A1 | 11/2003 |
| WO | WO-2005015934 A1 | 2/2005 |
| WO | WO-2005032186 A1 | 4/2005 |
| WO | WO-2006096037 A1 | 9/2006 |
| WO | WO-2008058128 A2 | 5/2008 |
| WO | WO-2008058130 A2 | 5/2008 |
| WO | WO-2010042595 A2 | 4/2010 |

OTHER PUBLICATIONS

Extended European Search Report issued by the European Patent Office for European Patent Application No. 07863966.3 dated Apr. 23, 2013 (8 pgs.).

Extended European Search Report issued by the European Patent Office for European Patent Application No. 09819799.9 dated Feb. 17, 2012 (9 pgs.).

International Search Report and Written Opinion Issued by the U.S. Patent and Trademark Office as International Searching Authority for International Application No. PCT/US07/83776 mailed Apr. 11, 2008 (6 pgs.).

International Search Report and Written Opinion Issued by the U.S. Patent and Trademark Office as International Searching Authority for International Application No. PCT/US07/83782 mailed dated Apr. 9, 2008 (7 pgs.).

International Search Report and Written Opinion Issued by the U.S. Patent and Trademark Office as International Searching Authority for International Application No. PCT/US2009/059810, dated May 17, 2010 (7 pgs.).

* cited by examiner

DETERMINING AN AVERAGE EFFECTIVE DATA THROUGH-PUT AS CORRESPONDS TO A NETWORK-SERVED END USER

RELATED APPLICATION(S)

This application claims the benefit of U.S. Provisional application No. 61/355,625, filed Jun. 17, 2010, which is incorporated by reference in its entirety herein.

TECHNICAL FIELD

This invention relates generally to ascertaining metrics regarding the performance of communications networks.

BACKGROUND

Communications networks of various kinds are known in the art. Many such networks utilize the Transmission Control Protocol (TCP) to govern and facilitate the movement of data packets through the network. In many such cases the vast majority of a given network's data volume flows as pertains to servicing end users comprise TCP data packets.

Network administrators monitor such communications networks to attempt to better understand the network's performance. A good understanding in these regards has many benefits including, in some cases, an enabled ability to identify service components that require upgrading or replacement. One metric of interest in these regards is sometimes referred to as "average throughput." Many prior art solutions use a sampling window (typically a few seconds or minutes) to measure the volume of data moving through the network. The average throughput in such a case typically comprises the measured volume divided by the duration of the sampling window.

Such an approach, however, can produce distorted results that do not necessarily well represent either system performance or the experience of the end user. Consider, for example, an end user who downloads a one megabyte file during an eight second flow of data. Many users would consider this to represent a relatively normal, average experience. If the measurement window, however, were one minute in duration, and if there were no other data flows during this measurement window, the apparent average throughput would be considerably smaller and hence present a very distorted view of the end user's experience.

BRIEF DESCRIPTION OF THE DRAWINGS

The above needs are at least partially met through provision of the approaches pertaining to determining an average effective data throughput as corresponds to a network-served end user described in the following detailed description, particularly when studied in conjunction with the drawings, wherein.

Figure 1:
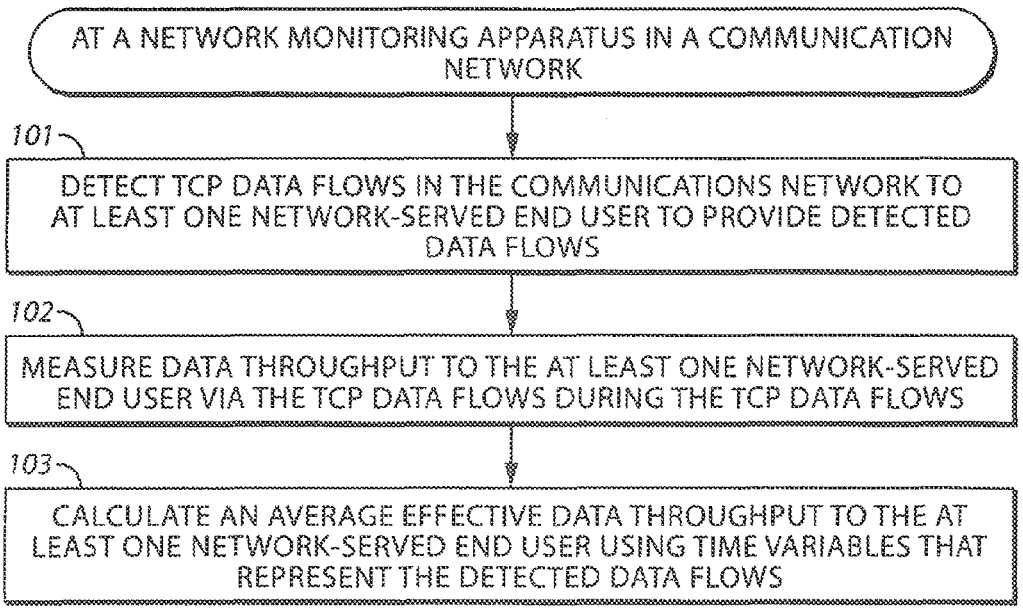
FIG. 1 comprises a flow diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a network monitoring apparatus in a communications network detects TCP data flows (to at least one network-served end user) to provide corresponding detected data flows. This apparatus then measures data throughput to this (or these) end user(s) via the TCP data flows and during the TCP data flows and calculates an average effective data throughput to this end user. This calculation can be based, by one approach, upon use of time variables that represent the detected data flows (to effectively garner a beginning-to-end view of the various TCP data flows while avoiding inclusion of other periods that represent no (or possible only a little) volume in these regards).

By one approach, detecting the TCP data flows can comprise detecting downlink TCP packets. This approach can, in turn, be combined with determining the aforementioned time variables by detecting corresponding uplink TCP acknowledgement packets from the network-served end user. Such an approach can be facilitated, for example, by timestamping the detected uplink TCP acknowledgement packets.

These teachings are highly flexible in practice and are readily scaled as well. For example, these teachings will readily accommodate the measurement and use of data volumes that correspond to more than one data flow concurrently providing data to the end user.

These teachings are also highly effective in practice at including the effects that are attributable to certain kinds of idle time while avoiding the effects that are attributable to other kinds of idle time to thereby yield a considerably more accurate picture of the end user's perceived experience. Excluded idle times, for example, can comprise such things as idle time that is based upon the end user's own behavior. Included idle times, on the other hand, can comprise such things as idle time that derives, for example, from in-transit buffering of packets that may occur in a network due to congestion, routing problems, and so forth.

These and other benefits may become clearer upon making a thorough review and study of the following detailed description. Referring now to the drawings, and in particular to FIG. 1, an illustrative process 100 that is compatible with many of these teachings will now be presented.

Figure 2:
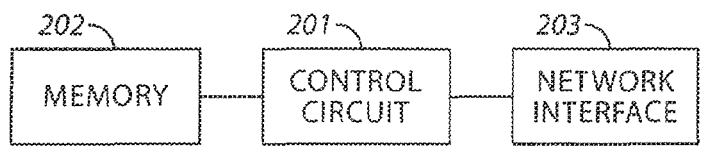
FIG. 2 comprises a block diagram as configured in accordance with various embodiments of the invention.

Generally speaking, this process 100 can be carried out by a network monitoring apparatus of choice. Referring momentarily to FIG. 2, this network monitoring apparatus 200 can comprise a control circuit 201 that operably couples to a memory 202 and a network interface 203. Such a control circuit 201 can comprise a fixed-purpose hard-wired platform or can comprise a partially or wholly programmable platform.

Such architectural options are well known and understood in the art. The memory 202 can serve, for example, to store some or all of the monitored and/or calculated information described herein. When the control circuit 201 comprises a partially or wholly-programmable platform, this memory 202 can also serve to store part or all of the control-circuit programming. The control circuit 201 itself is configured to carry out one or more of the steps, actions, and/or functions described herein as desired. The network interface 203, in turn, is configured to permit the network monitoring apparatus 200 to carry out the network-based interfacing described herein.

This network monitoring apparatus 200 can be disposed in-line with a network path if desired. For many application settings, however, it may be preferable to deploy the network monitoring apparatus 200 other than in-line with a network path. In that case the network monitoring apparatus 200 can be configured to receive, for example, a copy (such as a mirrored copy) of the packet traffic to thereby permit the network monitoring apparatus 200 to carry out, the functionality described herein without contributing to packet delay.

These teachings will accommodate using a significant number of network monitoring apparatuses 200 to carry out activities described herein. By one approach, however, these teachings will also accommodate locating the described functionality at a point of high packet aggregation in the mobile communication network. This might comprise, for example, locating the network monitoring apparatus 200 logically between the communication network's Gateway General Packet Radio Services (GPRS) Support Node (GGSN) and its Serving GPRS Support Node (SGSN).

In any event, and referring again to FIG. 1, at step 101 the network monitoring apparatus 200 detects TCP data flows in the communications network that are directed to at least one network-served end user to provide corresponding detected data flows. By one approach this can comprise detecting downlink TCP data flows (i.e., TCP data flows that are moving towards the end user) by these teachings can also be applied if desired when detecting uplink TCP data flows.

As described, herein, this process 100 also presumes having the network monitoring apparatus 200 detecting uplink TCP acknowledgement packets that are sent by the end user in response to having received the downlink TCP packets. This can include, if desired, timestamping the detected uplink TCP acknowledgement packets in order to provide time variables that can prove of considerable use as described below. As will be shown below these timestamped TCP acknowledgement packets can provide a relatively accurate and useful mechanism for truthfully assessing the end-user's throughput experiences.

In any event the network monitoring apparatus 200 at step 102 measures data throughput to the at least one network-served end user via the TCP data flows and during the TCP data flows. To be clear in these regards, this means that the network monitoring apparatus 200 will typically not attempt to measure data throughput other than during TCP data flows. Accordingly, when all TCP data flows have concluded and no follow-on TCP data flows have begun, the network monitoring apparatus 200 does not measure data throughput. This, of course, helps to avoid including the effects of idle times that are irrelevant to assessing the average-throughput experience of the end user. More particularly, and as described herein in more detail, these approaches permits one to precisely track user-received TCP packets because the end-user receiver acknowledges reception of those downlink packets. This, in turn, permits one to precisely calculate the average-throughput experience of an end user even when measured from the most aggregated part of the network. One net effect of this approach is to effectively ignore user/application idle times while including the network/equipment-induced idle time as described herein.

By one approach this measuring activity occurs over a plurality of discrete time periods that include measurement periods or windows. By one approach these discrete time periods are substantially temporally sequential (meaning there is little or no delay between consecutive time periods) and are all of essentially equal durations of time. The specific duration of time can vary as desired. By one approach, for example, the duration of time can be about five minutes though essentially any other duration may be appropriate to meet the specific requirements of a particular inquiry. The measurement periods/windows themselves as occur during these time periods, however, are a function of whatever TCP data flows might, or might not, be occurring at any given time and hence are of unpredictable length.

As noted earlier, there may be only one TCP data flow to a given end user during a particular period of time or there may be many such TCP data flows that flow concurrently with one another. It is also possible for the specific number of TCP data flows to vary during any given period of time and/or for other, non-TCP data flows (such as User Datagram Protocol (UDP) data flows) to be present as well, either concurrently with one or more TCP data flows or in the absence of any TCP data flows. These teachings are sufficiently flexible to accommodate all of the foregoing possibilities.

Figure 3:
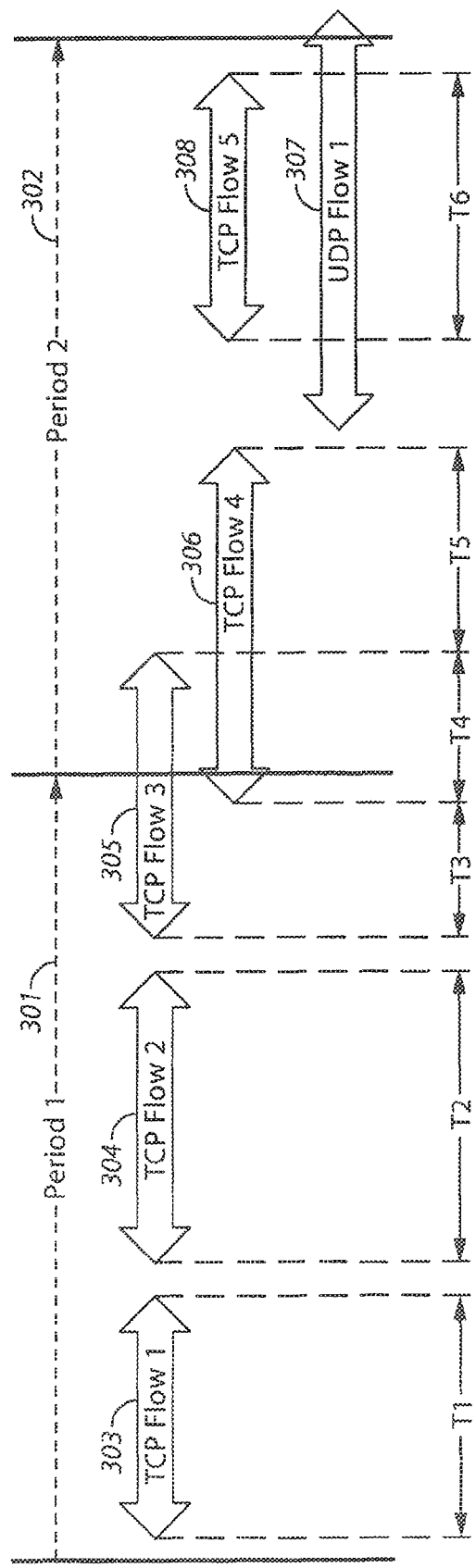
FIG. 3 comprises a timing diagram as configured in accordance with various embodiments of the invention.

FIG. 3 provides some helpful illustrative examples in these regards. FIG. 3 depicts two consecutive time periods 301 and 302 of five minutes duration each. During the first period 301 a first TCP data flow 303 begins and ends, followed by a second TCP data flow 304 that also begins and ends, followed finally by a third TCP data flow 305 that begins during the first period 301 but does not end during the first period 301. It may also be noted that a fourth TCP data flow 306 begins during the first period 301 while the third TCP data flow 305 is flowing.

In the second, follow-up period of time 302, the third and fourth TCP data flows 305 and 306 continue to flow concurrently with one another until the third TCP data flow 305 concludes and leaves only the fourth TCP data flow 306 until the latter, too, concludes. A UDP data flow 307 then begins to flow. Before the UDP data flow 307 concludes a fifth TCP data flow 308 also begins and ends.

Pursuant to these teachings, the described process 100 monitors data volume that aggregates during times when TCP data flows are flowing. For example, data volume metrics are gathered (for example, by simply incrementing a corresponding volume count as uplink TCP acknowledgements are received in response to corresponding downlink TCP flows) in the first period 301 only during times when TCP flows are flowing as indicated by the flow durations denoted by T1, T2, T3, T4, T5, and T6. This approach provides for counting data volume that occurs during a TCP data flow but not otherwise.

Accordingly, times other than when TCP data flows exist are effectively ignored. This includes times when there are no data flows (as occurs, for example, between the first TCP data flow 303 and the second TCP data flow 304) and also during times when there are only non-TCP data flows such as the UDP data flow 307. (Although such an approach will tend to miss some data volume that is attributable to non-TCP data flows, in many communication systems the TCP data flows represent the overwhelming majority of data throughput and hence the missed data will typically not unduly skew the value of these measurements.

Referring again to FIG. 1, at step 103 this process 100 then provides for calculating an average effective data throughput to the at least one network-served end user using time variables (such as the timestamps for the aforementioned uplink TCP acknowledgement packets) that represent the detected data flows. When a given monitoring period only includes solo TCP data flows, this can simply comprise dividing the accumulated data volume as was measured during the monitoring period by the total time TCP data flows were flowing. With reference again to FIG. 3, and as a simple example in these regards, if the first monitoring period 301 included only the first and second TCP data flows 303 and 304, this would comprise dividing the total aggregated data volume for these two TCP data flows 303 and 304 divided by the time represented by T1 plus T2. The remaining time that represents this first monitoring period 301 would therefore be effectively ignored.

To the extent that these measurements are reported on a per-monitoring-period basis, it can be helpful to associate a given flow with a given monitoring period based upon when that flow concludes. As shown in FIG. 3, then, the first and second TCP data flows 303 and 304 will have their aggregated volume measurements associated with the first monitoring period 301. The fourth TCP data flow 306, however, will be associated with the second monitoring period 302 even though the fourth monitoring period 306 begins during the first monitoring period 301.

The third TCP data flow 305 represents an exception to the foregoing, with a portion of this data flow 305 (that part which is associated with time T3) being associated with the first monitoring period 301 while the remaining portion of this data flow 305 (that part which is associated with time T4) is associated with the second monitoring period 302. This is because, in this illustrative example, the measurement activity switched from a single-flow measurement mode to a multi-flow measurement mode and the monitoring/measurement process (in this example) terminates a single-flow measurement period (and begins a multi-flow measurement period) when the measurement approach switches from single flow to multi-flow.

As noted above and as illustrated in FIG. 3, there are times when multiple flows are concurrently flowing to a given end user. These teachings will support accounting for such a circumstance in a unique but effective manner. By one approach, this can comprise tracking time during a multi-flow episode as a function of only one of the TCP data flows but aggregating data from all flows during the multi-flow episode (regardless of whether those supplemental flows are TCP data flows or non-TCP data flows).

In the example shown in FIG. 3, where the fourth TCP data flow 306 begins and hence gives rise to a multi-flow episode in conjunction with the third TCP data flow 305, the multi-flow episode begins in the first monitoring period 301 but concludes in the second monitoring period 302. The measured multi-flow time duration (represented by T4) and the corresponding data volume attributable to both of these flows 305 and 306 are therefore associated with the second monitoring period 302.

In this particular example, the multi-flow mode of measuring persists even after the third TCP data flow 305 concludes and continues until, in this case, an idle time occurs when the fourth TCP data flow 306 concludes in the absence of any other concurrent TCP data flows. These teachings will readily accommodate doing otherwise, however. For example, the measurement mechanism could switch from a multi-flow mode to a single-flow mode when the third TCP data flow 305 concludes and leaves only the fourth TCP data flow 306.

These single-flow measurement modes and multi-flow measurement modes can serve to delineate corresponding metrics in these same regards. For example, when the aforementioned measurement of data comprises aggregating data throughput measurements over predetermined windows of time as discussed above, this process 100 can provide for separately aggregating a variety of useful measurements over such time frames. An example in these regards is to separately aggregate measurements for each of:

data-flow volume for solo TCP data flows to the network-served end user when a flow-monitoring duration is characterized as having only a single TCP data flow being provided to the network-served end user;

data-flow durations for solo TCP data flows to the network-served end user when a flow-monitoring duration is characterized as having only a single TCP data flow being provided to the network-served end user;

data-flow volume for multiple TCP data flows to the network-served end user when a flow-monitoring duration is characterized as having multiple TCP data flows concurrently being provided to the network-served end user; and data-flow durations for multiple TCP data flows to the network-served end user when a flow-monitoring duration is characterized as having multiple TCP data flows concurrently being provided to the network-served end user.

As described above, such aggregation can comprise aggregating measurements regarding a number of temporally-discrete measurement periods that are conducted over a single such predetermined window of time. By way of example, and referring again to FIG. 3, the first monitoring period 301 can be viewed as having three such measurement periods for single-flow periods (T1, T2, and T3) while the second monitoring period 302 can be viewed as having three multi-flow periods (T4, T5, and T6). Per these teachings it is not required that such temporally-discrete measurement periods abut one another though such is permitted when such a circumstance reflects the data flows of a particular predetermined window of time.

It may be noted that in the example provided above, the single flow portion of the fourth TCP flow 306 (i.e., T5) is referred to as a multi-flow example. This, of course, is not literally true. For measurement purposes, however, it can be expedient to continue to treat the remaining portion of the fourth TCP flow 306 as being part of a multi-flow event as this simply requires continuing with the already-designated multi-flow status. If desired, of course, one could modify this approach and provide for re-categorizing the concluding portion (i.e., time T5) of the fourth TCP flow 306 as comprising a single-flow measurement period.

By one approach, a given flow-monitoring duration can be characterized (for the purposes of aggregating data as per the foregoing) as having multiple TCP data flows when the flow-monitoring begins with multiple TCP data flows.

By aggregating such data throughput measurements over a plurality of predetermined windows of time one can readily and realistically gauge the network-served end user's throughput experience. These same measurements will also facilitate identifying slowness in average effective throughput that is attributable to individual service components of the communications network.

Per the foregoing, and by way of a more specific example, only a single TCP connection per Packet Data Protocol (PDP) session is analyzed for effective throughput. A TCP connection can be identified, for example, using a combination of source IP address, source port number, destination IP address, and/or destination port number. That said, and as described above, there can be more than one TCP flow that is analyzed in a single reporting period per PDP session.

For the purpose of the following illustrative examples, Start Time is the time when the effective throughput measurement starts. This is the timestamp when the first valid uplink TCP ACK* arrives for a download TCP packet having a payload greater than zero and the PDP session state is IDLE. End Time, in turn, is the timestamp of the last valid uplink TCP ACK* for a downlink TCP packet having a payload greater than zero and when the PDP session state is in DOWNLOAD. More particularly, this is timestamp of the:
a) last valid uplink ACK* packet for a downlink TCP packet having a payload, before the FIN/RST packet in either direction; or
b) an uplink FIN/RST packet if the last uplink ACK for the downlink TCP packet having a payload is received as part of the uplink FIN/RST packet (this being the end of the TCP connection); or
c) a last valid uplink ACK* packet for the download TCP packet having payload, before a new uplink TCP packet with payload has arrived (this being the start of IDLE time that is attributable, for example, to the end user); or
d) an uplink TCP packet having payload if the uplink ACK for a download payload packet (of the current monitored session) is received as part of this uplink TCP packet with payload; or
e) a last uplink ACK* packet when the TCP connection is timed out; or
f) a last uplink ACK* packet when the PDP session is ended; where uplink ACK* refers to an uplink packet that acknowledges a downlink TCP packet having a payload greater than zero. TCP duplicates, OOS, retransmissions and window updates are not valid acknowledgements in these regards.

Figure 4:
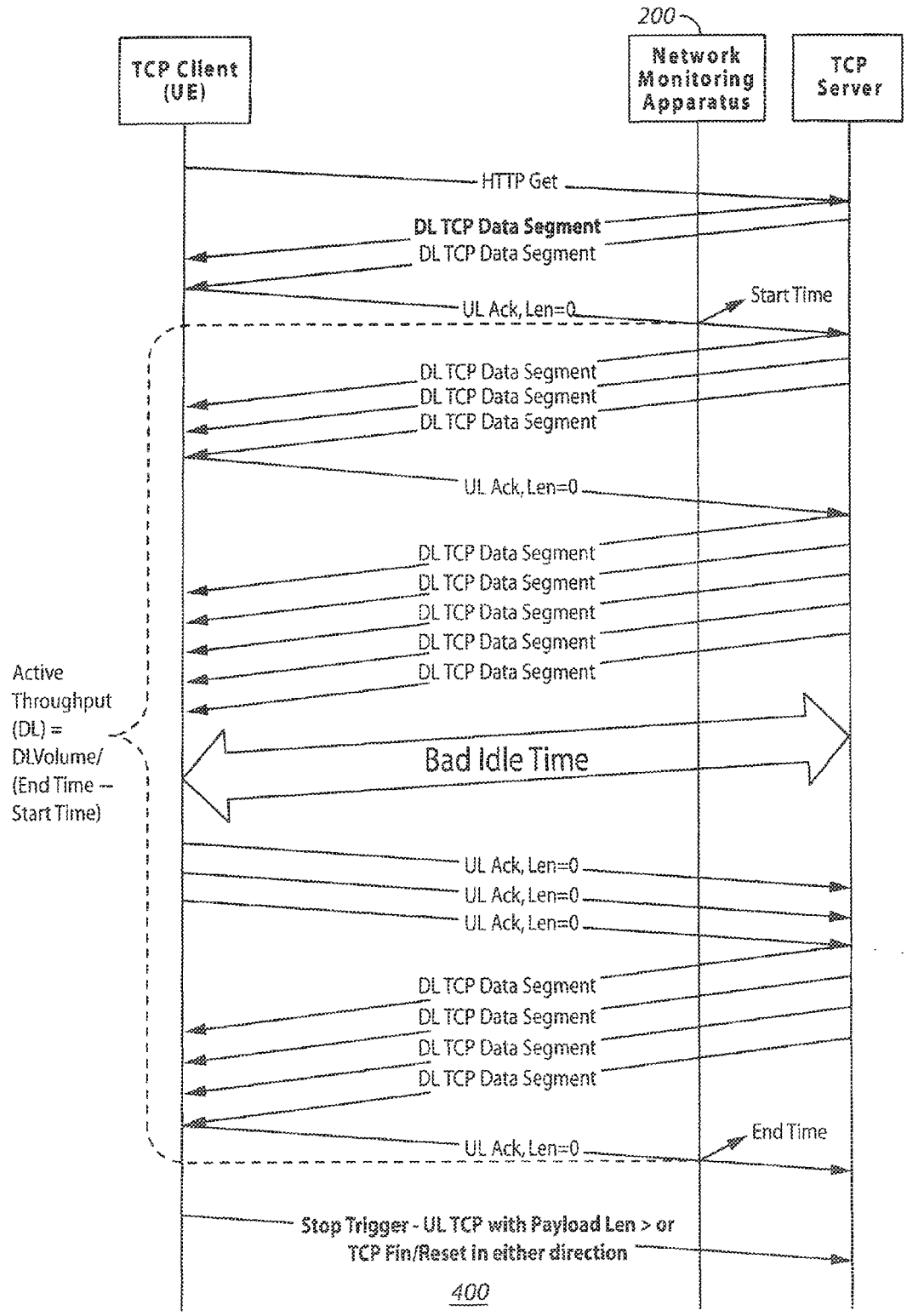
FIG. 4 comprises a signal flow diagram as configured in accordance with various embodiments of the invention.

FIG. 4 provides an illustrative example in these regards. In the illustrated timing diagram 400, the start time for the flow-measurement period (during which data volume is measured) is the first uplink TCP ACK for a corresponding downlink TCP packet having payload. The end time, in turn, is identified as explained above. In this sequence the arrival of TCP FIN or an uplink packet with payload drives a conclusion that the TCP uplink ACK timestamp before this TCP packet is the stop time.

The following state tables serve to summarize the foregoing and to also, in some cases, provide further points of specificity. No particular limitations with respect to the scope of these teachings are intended by such specificity.

TABLE 1

| States | TCP Effective Throughput States are maintained for each PDP Session |
|---|---|
| IDLE | a) TCP Connection not established, No SYN/SYN-ACK exchanged, or |
| | b) TCP Connection established, but the first valid UL ACK for the DL packet with payload has not arrived, or |
| | c) Before the Start Time and after the End Time, the TCP Effective Throughput state is in IDLE. |
| DOWNLOAD | Between the Start Time and End Time, the TCP Effective Throughput state is DOWNLOAD. |

TABLE 2

| Start Time and End Time | With respect to the Effective Throughput measured for DL packets with payload. |
|---|---|
| Start Time | This is the timestamp when the first valid UL TCP ACK comes for a DL TCP packet with payload greater than zero and when the PDP session TCP Effective Throughput state is in IDLE. |
| End Time | When the PDP session TCP Effective Throughput state is in DOWNLOAD, <br> a) Last valid UL ACK* packet for a DL TCP packet with payload, before the FIN/RST packet in either direction, or <br> b) UL FIN/RST packet if the last UL ACK for the DL TCP packet with payload is received as part of the UL FIN/RST packet. This is the end of the TCP connection, or <br> c) Last valid UL ACK* packet for the DL TCP packet with payload, before a new UL TCP packet with payload has arrived. This is the start of good IDLE time, or <br> d) UL TCP packet with payload if the UL ACK for a DL payload packet (of the current monitored session) is received as part of this UL TCP packet with payload, or <br> e) Last UL ACK* packet when the TCP connection is timed out. <br> f) Last UL ACK* packet when the PDP session is ended. <br> UL ACK*: Uplink packet that acknowledges DL TCP packet with payload greater than zero. TCP Duplicates, OOS, Retransmissions and Window Updates are not valid acknowledgements. |

Note that as used in these illustrative examples, Total DL Volume is the absolute sum of all download bytes (including TCP headers) that are transmitted in a current sampling period. Total DL TCP Monitored Volume is the total DL TCP volume in a current sampling period that is accumulated between all the start and the end times for all the monitored TCP connections. Total DL Time Duration is the sum of all (end time-start time) in the current sampling period in the DL direction.

As regards Current DL Unmonitored Volume, when a particular DL TCP Connection is being monitored for Effective Throughput, all other DL unmonitored TCP and UDP/Non-TCP connections volume in the same PDP session will be accumulated in a volume counter referred to herein as Current DL Unmonitored Volume Counter. This current DL Unmonitored Volume is added to the Total DL Unmonitored Volume whenever a valid UL ACK is received.

Current UL TCP ACK is the latest/highest UL TCP ACK number (wrap around considered) of the monitored TCP connection between a particular Start time and End Time. Only TCP connections are monitored. As regards the Starting TCP Sequence Number, this refers to the TCP packet's sequence number for which the state Monitoring has started.

Number_DL_Periods is the number of "start-end" periods in a particular sampling period in the DL direction.

As regards the IDLE to DOWNLOAD Threshold, there are at least three options that may help to change the session state from IDLE to DOWNLOAD. One threshold can reflect when the amount of TCP volume that is acknowledged in the current monitored TCP connection is greater than a certain threshold provisioned. A second threshold can reflect when the total DL volume (TCP UDP) for the current PDP session is greater than a particular threshold volume provisioned. And a third threshold can reflect when the number of UL TCP acknowledgements is greater than a threshold provisioned. For the purposes of these illustrative examples it can be presumed that the first threshold described above is used.

As regards TCP connection timed out, a Monitored TCP connection will be timed out after 60 seconds (or as provisioned) of inactivity in both directions. A TCP Retransmission, OOS, Duplicate ACK, or Window Update is considered to be an activity of the TCP connection. Monitored TCP connection profile will be cleared and the Effective Throughput analysis will be completed as explained below.

The following metrics can be reported, if desired, at the end of each sampling period: Total DL Volume, Total DL TCP Monitored Volume, Total DL Unmonitored Volume, Total DL Time Duration, Number_DL_Periods, and Multiple_DL_TCP_Flag. Single DL Effective Throughput, Single DL Effective Throughput Duration, Multiple DL Effective Throughput, Multiple DL Effective Duration and Number of DL Periods. (TCP Duplicate, OOS, Retransmissions, and Window Update packets are not considered as valid packets in the analysis per this example.)

TABLE 3

| | TCP Effective Throughput State | |
| --- | --- | --- |
| Event | IDLE | DOWNLOAD |
| TCP SYN/SYN-ACK exchange. | Ignore. | SYN/SYN-ACK is for a different TCP connection in the same PDP session. In the SYN/SYN-ACK there will not be any TCP payload volume. See specific direction cases below. |
| DL (Server) TCP packet with payload (No - Monitored TCP connection currently). | a. Make this packet's TCP connection as the current Monitored TCP connection if no other TCP connection is being monitored.<br>b. Record the current packet's TCP Sequence number as the Starting TCP Sequence Number.<br>c. Update next expected TCP sequence number. | N/A |
| DL (Server) TCP packet with no payload (No Monitored TCP connection currently). | Ignore. | N/A |
| DL (Server) TCP packet with payload that belongs to the current Monitored TCP connection. | Update current and next expected sequence number. | Update current and next expected sequence number. |
| DL (Server) TCP packet with no payload that belongs to the current Monitored TCP connection. | Ignore. | Ignore. |
| DL (Server) TCP packet with payload that does not belong to the current Monitored TCP connection (Monitored TCP connection exists). | Add GTP Volume to the DL Current DL Unmonitored Volume. | Add GTP Volume to the DL Current DL Unmonitored Volume. |
| DL (Server) TCP packet with no payload that does not belong to the current Monitored TCP connection (Monitored TCP connection exists). | Add GTP Volume to the DL Current DL Unmonitored Volume. | Add GTP Volume to the DL Current DL Unmonitored Volume. |
| DL UDP/Non-TCP packet. | Add UDP/Non-TCP Volume to the DL Current DL Unmonitored Volume. | a. Add UDP/Non-TCP Volume to the DL Current DL Unmonitored Volume. Monitoring session exists. |
| UL UDP/Non TCP packet. | Ignore. | Ignore. |
| UL (Client) TCP packet with payload (No Monitored TCP connection currently) | Ignore. | Ignore. |

TABLE 3-continued

| | TCP Effective Throughput State | |
|---|---|---|
| Event | IDLE | DOWNLOAD |
| UL (Client) TCP packet with no payload (No Monitored TCP connection currently) | Ignore. | Ignore. |
| UL (Client) ACK packet with no payload that belongs to the current Monitored TCP connection. | a. Drop Duplicate and TCP Window Update packets.<br>b. If the ACK is valid, set the Current UL TCP ACK to ACK number that is received in this TCP packet. TCP OOS, Duplicate, Window update packets are invalid and ignored. Record the timestamp of the ACK.<br>c. Check the difference between the Starting TCP Sequence Number and the current ACK number. If this (difference plus the current unmonitored volume) is greater than the IDLE to DOWNLOAD Threshold, change the state from IDLE to DOWNLOAD. This filtering is done only for the first TCP connection after the PDP session establishment or after a gap of one sampling interval between two TCP connections.<br>d. If State is changed from IDLE to DOWNLOAD, Record the current packet's timestamp as Start Time, reset Current Unmonitored Volume and set Number_DL_Periods = +1.<br>e. Set Session Type to Single. Ignore the multiple sessions traffic presence until a session state is changed from IDLE to DOWNLOAD. | a. Drop Duplicate and TCP Window Update packets.<br>b. If the ACK is valid, set the Current UL TCP ACK to ACK number that is received in this TCP packet. TCP OOS, Duplicate, Window update packets are invalid and ignored. Record the timestamp of the ACK.<br>c. If there is Current Unmonitored volume and if the session state is Single, check the amount of total single session volume in this period before the current acknowledgement. If it is greater than or equal to Single to Multi Session Convert Threshold, complete the single session and start multi session in download state. End time of the single session is the current end time which is the time of the previous acknowledgement. The Start time of the Multi session is the current end time. Set Number_DL_Periods = +1.<br>d. If there is Current Unmonitored volume and if the session state is Single, check the amount of total single session volume in this period. If it is lesser than Single to Multi Session Convert Threshold, convert the single session to multi session in download state. The Start time of the Multi session is same as the current single session start time.<br>e. Add current Unmonitored volume to the Total DL Multiple sessions Effective Volume.<br>f. Clear Current Unmonitored Volume. |
| UL (Client) TCP packet with payload that belongs to the current Monitored TCP connection. | a. Clear current Monitored TCP connection profile. Clear Starting TCP Sequence Number, Next expected sequence number and Current UL TCP ACK. Reset Current Unmonitored Volume.<br>b. Need to select a new Monitored TCP connection because we received UL TCP packet with payload. | a) Treat the Current Monitored TCP data transaction as complete.<br>b) If a valid ACK is received (ACK that was pending) for the current monitored session, it is updated to the Current UL TCP ACK and the current time is the time stamp of the final valid ACK.<br>c) If there is Current Unmonitored volume and if the session state is Single, check the amount of total single session volume in this period before the current acknowledgement. If it is greater than or equal to Single to Multi Session Convert Threshold, complete the single session |

TABLE 3-continued

| | TCP Effective Throughput State | |
|---|---|---|
| Event | IDLE | DOWNLOAD |
| | | and start multi session in download state. End time of the single session is the current end time which is the time of the previous acknowledgement. The Start time of the Multi session is the current end time. Set Number_DL_Periods = +1.<br>d) If there is Current Unmonitored volume and if the session state is Single, check the amount of total single session volume in this period. If it is lesser than Single to Multi Session Convert Threshold, convert the single session to multi session in download state. The Start time of the Multi session is same as the current single session start time.<br>e) Add current Unmonitored volume to the Total DL Multiple sessions Effective Volume.<br>f) (Current UL TCP ACK − (Starting TCP Sequence Number + IDLE to DOWNLOAD Threshold Volume)) is the DL TCP volume in the current period. Add this volume to either the Total DL Single or Multiple sessions Effective Volume based on the type of monitored flow.<br>g) The end time was the time of the last valid acknowledgement which was recorded earlier. Add the current period's duration (end time − start time) to either the Single or Multiple Sessions Monitored DL Time Duration based on the type of monitored flow.<br>h) Total DL Multiple sessions Effective Volume += Current Unmonitored Volume.<br>i) Clear Current Unmonitored Volume.<br>j) Change state to IDLE. |
| UL (Client) TCP packet with payload that does not belong to the current Monitored TCP connection (Monitored TCP connection exists). | Ignore. | Ignore. |
| UL (Client) packet with no payload that does not belong to the current Monitored TCP connection (Monitored TCP connection exists). | Ignore. | Ignore. |
| FIN, FIN-ACK, RST, RST-ACK from DL | a) Clear current Monitored TCP connection profile. Clear Starting TCP Sequence Number, Next expected sequence number and Current UL TCP ACK. | a) Treat the Current Monitored TCP data transaction as complete.<br>b) If a valid ACK is received (ACK that was pending) for the current monitored |

TABLE 3-continued

| | TCP Effective Throughput State | |
|---|---|---|
| Event | IDLE | DOWNLOAD |
| | Reset Current Unmonitored Volume.<br>b) Need to select a new Monitored TCP connection because we received UL TCP packet with payload. | session, it is updated to the Current UL TCP ACK and the current time is the time stamp of the final valid ACK.<br>c) If there is Current Unmonitored volume and if the session state is Single, check the amount of total single session volume in this period before the current acknowledgement. If it is greater than or equal to Single to Multi Session Convert Threshold, complete the single session and start multi session in download state. End time of the single session is the current end time which is the time of the previous acknowledgement. The Start time of the Multi session is the current end time. Set Number_DL_Periods = +1.<br>d) If there is Current Unmonitored volume and if the session state is Single, check the amount of total single session volume in this period. If it is lesser than Single to Multi Session Convert Threshold, convert the single session to multi session in download state. The Start time of the Multi session is same as the current single session start time.<br>e) Add current Unmonitored volume to the Total DL Multiple sessions Effective Volume.<br>f) (Current UL TCP ACK − (Starting TCP Sequence Number + IDLE to DOWNLOAD Threshold Volume)) is the DL TCP volume in the current period. Add this volume to either the Total DL Single or Multiple sessions Effective Volume based on the type of monitored flow.<br>g) The end time was the time of the last valid acknowledgement which was recorded earlier. Add the current period's duration (end time − start time) to either the Single or Multiple Sessions Monitored DL Time Duration based on the type of monitored flow.<br>h) Total DL Multiple sessions Effective Volume += Current Unmonitored Volume.<br>i) Clear Current Unmonitored Volume.<br>j) Change state to IDLE. |

TABLE 3-continued

| | TCP Effective Throughput State | |
|---|---|---|
| Event | IDLE | DOWNLOAD |
| FIN, FIN-ACK, RST, RST-ACK from UL | a) Clear current Monitored TCP connection profile. Clear Starting TCP Sequence Number, Next expected sequence number and Current UL TCP ACK. Reset Current Unmonitored Volume.<br>b) Need to select a new Monitored TCP connection because we received UL TCP packet with payload. | a) Treat the Current Monitored TCP data transaction as complete.<br>b) If a valid ACK is received (ACK that was pending) for the current monitored session, it is updated to the Current UL TCP ACK and the current time is the time stamp of the final valid ACK.<br>c) If there is Current Unmonitored volume and if the session state is Single, check the amount of total single session volume in this period before the current acknowledgement. If it is greater than or equal to Single to Multi Session Convert Threshold, complete the single session and start multi session in download state. End time of the single session is the current end time which is the time of the previous acknowledgement. The Start time of the Multi session is the current end time. Set Number_DL_Periods = +1.<br>d) If there is Current Unmonitored volume and if the session state is Single, check the amount of total single session volume in this period. If it is lesser than Single to Multi Session Convert Threshold, convert the single session to multi session in download state. The Start time of the Multi session is same as the current single session start time.<br>e) Add current Unmonitored volume to the Total DL Multiple sessions Effective Volume.<br>f) (Current UL TCP ACK − (Starting TCP Sequence Number + IDLE to DOWNLOAD Threshold Volume)) is the DL TCP volume in the current period. Add this volume to either the Total DL Single or Multiple sessions Effective Volume based on the type of monitored flow.<br>g) The end time was the time of the last valid acknowledgement which was recorded earlier. Add the current period's duration (end time − start time) to either the Single or Multiple Sessions Monitored DL Time Duration based on the type of monitored flow. |

TABLE 3-continued

| | TCP Effective Throughput State | |
|---|---|---|
| Event | IDLE | DOWNLOAD |
| | | h) Total DL Multiple sessions Effective Volume += Current Unmonitored Volume.<br>i) Clear Current Unmonitored Volume.<br>j) Change state to IDLE. |
| TCP connection timed out/swapped out. | a) Clear current Monitored TCP connection profile. Clear Starting TCP Sequence Number, Next expected sequence number and Current UL TCP ACK. Reset Current Unmonitored Volume.<br>b) Need to select a new Monitored TCP connection because we received UL TCP packet with payload. | a) Treat the Current Monitored TCP data transaction as complete.<br>b) If a valid ACK is received (ACK that was pending) for the current monitored session, it is updated to the Current UL TCP ACK and the current time is the time stamp of the final valid ACK.<br>c) If there is Current Unmonitored volume and if the session state is Single, check the amount of total single session volume in this period before the current acknowledgement. If it is greater than or equal to Single to Multi Session Convert Threshold, complete the single session and start multi session in download state. End time of the single session is the current end time which is the time of the previous acknowledgement. The Start time of the Multi session is the current end time. Set Number_DL_Periods = +1.<br>d) If there is Current Unmonitored volume and if the session state is Single, check the amount of total single session volume in this period. If it is lesser than Single to Multi Session Convert Threshold, convert the single session to multi session in download state. The Start time of the Multi. session is same as the current single session start time.<br>e) Add current Unmonitored volume to the Total DL Multiple sessions Effective Volume.<br>f) (Current UL TCP ACK − (Starting TCP Sequence Number + IDLE to DOWNLOAD Threshold Volume)) is the DL TCP volume in the current period. Add this volume to either the Total DL Single or Multiple sessions Effective Volume based on the type of monitored flow.<br>g) The end time was the time of the last valid acknowledgement which was recorded earlier. Add the current period's duration (end time − start time) to either the Single or |

TABLE 3-continued

| | TCP Effective Throughput State | |
|---|---|---|
| Event | IDLE | DOWNLOAD |
| | | Multiple Sessions Monitored DL Time Duration based on the type of monitored flow.<br>h) Total DL Multiple sessions Effective Volume += Current Unmonitored Volume.<br>i) Clear Current Unmonitored. Volume.<br>j) Change state to IDLE. |
| PDP Session Closed/Deleted. | c) Clear current Monitored TCP connection profile. Clear Starting TCP Sequence Number, Next expected sequence number and Current UL TCP ACK. Reset Current Unmonitored Volume.<br>d) Need to select a new Monitored TCP connection because we received UL TCP packet with payload. | a) Treat the Current Monitored TCP data transaction as complete.<br>b) If a valid ACK is received (ACK that was pending) for the current monitored session, it is updated to the Current UL TCP ACK and the current time is the time stamp of the final valid ACK.<br>c) If there is Current Unmonitored volume and if the session state is Single, check the amount of total single session volume in this period before the current acknowledgement. If it is greater than or equal to Single to Multi Session Convert Threshold, complete the single session and start multi session in download state. End time of the single session is the current end time which is the time of the previous acknowledgement. The Start time of the Multi session is the current end time. Set Number_DL_Periods = +1.<br>d) If there is Current Unmonitored volume and if the session state is Single, check the amount of total single session volume in this period. If it is lesser than Single to Multi Session Convert Threshold, convert the single session to multi session in download state. The Start time of the Multi session is same as the current single session start time.<br>e) Add current Unmonitored volume to the Total DL Multiple sessions Effective Volume.<br>f) (Current UL TCP ACK − (Starting TCP Sequence Number + IDLE to DOWNLOAD Threshold Volume)) is the DL TCP volume in the current period. Add this volume to either the Total DL Single or Multiple sessions Effective Volume based on the type of monitored flow. |

TABLE 3-continued

| | TCP Effective Throughput State | |
|---|---|---|
| Event | IDLE | DOWNLOAD |
| | | g) The end time was the time of the last valid acknowledgement which was recorded earlier. Add the current period's duration (end time − start time) to either the Single or Multiple Sessions Monitored DL Time Duration based on the type of monitored flow.<br>h) Total DL Multiple sessions Effective Volume += Current Unmonitored Volume.<br>i) Report Total DL Volume, Total DL Single Session Effective Throughput, Total DL Single Session Time Duration, Total DL Multiple Session Effective Throughput, Total DL Multiple Session Time Duration and Number_DL_Periods.<br>j) Clear Current Unmonitored Volume.<br>k) Change state to IDLE. |
| End of Sampling Interval | a) Report Total DL Volume, Total DL TCP Monitored Volume, Total DL Unmonitored Volume, Total DL Time Duration and Number_DL_Periods.<br>b) Reset all flags and counters. | a) Treat the Current Monitored TCP data transaction as complete.<br>b) If a valid ACK is received (ACK that was pending) for the current monitored session, it is updated to the Current UL TCP ACK and the current time is the time stamp of the final valid ACK.<br>c) If there is Current Unmonitored volume and if the session state is Single, check the amount of total single session volume in this period before the current acknowledgement. If it is greater than or equal to Single to Multi Session Convert Threshold, complete the single session and start multi session in download state. End time of the single session is the current end time which is the time of the previous acknowledgement. The Start time of the Multi session is the current end time. Set Number_DL_Periods = +1.<br>d) If there is Current Unmonitored volume and if the session state is Single, check the amount of total single session volume in this period. If it is lesser than Single to Multi Session Convert Threshold, convert the single session to multi session in download state. The Start time of the Multi session is same as the current single session start time. |

TABLE 3-continued

| | TCP Effective Throughput State | |
|---|---|---|
| Event | IDLE | DOWNLOAD |
| | | e) Add current Unmonitored volume to the Total DL Multiple sessions Effective Volume.
f) (Current UL TCP ACK – (Starting TCP Sequence Number + IDLE to DOWNLOAD Threshold Volume)) is the DL TCP volume in the current period. Add this volume to either the Total DL Single or Multiple sessions Effective Volume based on the type of monitored flow.
g) The end time was the time of the last valid acknowledgement which was recorded earlier. Add the current period's duration (end time – start time) to either the Single or Multiple Sessions Monitored DL Time Duration based on the type of monitored flow.
h) Total DL Multiple sessions Effective Volume += Current Unmonitored Volume.
i) Report Total DL Volume, Total DL Single Session Effective Throughput, Total DL Single Session Time Duration, Total DL Multiple Session Effective Throughput, Total DL Multiple Session Time Duration and Number_DL_Periods.
j) Reset Total DL Volume, Total DL Single Session Effective Throughput, Total DL Single Session Time Duration, Total DL Multiple Session Effective Throughput, Total DL Multiple Session Time Duration and set Number_DL_Periods = 1.
k) Roll over the current monitored TCP connection details to the next sampling interval. Maintain the Monitored TCP profile and Start time. Start Time is the current period's End time that is to be used in the next sampling period. Current DL Unmonitored Volume is not reset. |
| TCP SYN/SYN-ACK exchange. | Ignore. | SYN/SYN-ACK is for a different TCP connection in the same PDP session. In the SYN/SYN-ACK there will not be any TCP payload volume. See specific direction cases below. |
| DL (Server) TCP packet with payload (No Monitored TCP connection currently). | a) Make this packet's TCP connection as the current Monitored TCP connection if no other TCP connection is being monitored. | N/A |

TABLE 3-continued

TCP Effective Throughput State

| Event | IDLE | DOWNLOAD |
|---|---|---|
| | b) Record the current packet's TCP Sequence number as the Starting TCP Sequence Number.<br>c) Add the DL volume to the Total DL Volume. This may be useful in the process of changing the state from IDLE to DOWNLOAD.<br>d) This volume is not added to the Total Monitored TCP Volume for Effective Throughput measurements. | |
| DL (Server) TCP packet with no payload (No Monitored TCP connection currently). | Ignore. | N/A |
| DL (Server) TCP packet with payload that belongs to the current Monitored TCP connection. | a) Add the DL volume to the Total DL Volume. This may be useful in the process of changing the state from IDLE to DOWNLOAD.<br>b) This volume is not added to the Total Monitored TCP Volume for Effective Throughput measurements. | Ignore. |
| DL (Server) TCP packet with no payload that belongs to the current Monitored TCP connection. | Ignore. | Ignore. |
| DL (Server) TCP packet with payload that does not belong to the current Monitored TCP connection (Monitored TCP connection exists). | Ignore. | Add TCP Volume to the DL Current Unmonitored Volume.<br>Current Unmonitored Volume += TCP payload in this packet. Set Multiple_DL_TCP_Flag. |
| DL (Server) TCP packet with no payload that does not belong to the current Monitored TCP connection (Monitored TCP connection exists). | Ignore. | No TCP Volume. Set Multiple_DL_TCP_Flag? Or Ignore? Leaning towards Ignore. |
| DL UDP/Non-TCP packet. | Ignore. | Add UDP/Non-TCP Volume to the Current DL Unmonitored Volume.<br>Current Unmonitored Volume += UDP/Non TCP payload in this packet. Monitoring session exists. |
| UL UDP/Non TCP packet. | Ignore. | Ignore. |
| UL (Client) TCP packet with payload (No Monitored TCP connection currently) | Ignore. | Ignore. |
| UL (Client) TCP packet with no payload (No Monitored TCP connection currently) | Ignore. | Ignore. |
| UL (Client) ACK packet with no payload that belongs to the current Monitored TCP connection. | a) Drop Duplicate and TCP Window Update packets.<br>b) Set the Current UL TCP ACK to ACK number that is received in this TCP packet. If there are OOS/Duplicate packets ignore the old packet. Record the timestamp of the ACK.<br>c) Check the difference between the Starting TCP Sequence Number and the ACK number. If the difference is greater than the IDLE to DOWNLOAD Threshold, change the state from IDLE to DOWNLOAD. This filtering is done only for the first | a) Drop Duplicate and TCP Window Update packets.<br>b) Set the Current UL TCP ACK to ACK number that is received in this TCP packet. TCP OOS, Duplicate, Window update packets are invalid and ignored.<br>c) If the ACK is valid, Record the time stamp of the ACK.<br>d) Total Unmonitored Volume += Current Unmonitored Volume. |

TABLE 3-continued

| | TCP Effective Throughput State | |
|---|---|---|
| Event | IDLE | DOWNLOAD |
| | TCP connection after the PDP session establishment or after a gap of one sampling interval between two TCP connections.<br>d) If State is changed from IDLE to DOWNLOAD, Record the current packet's timestamp as Start Time.<br>e) If State is changed from IDLE to DOWNLOAD, Number_DL_Periods = +1.<br>f) Reset Current Unmonitored Volume. | e) Clear Current Unmonitored Volume. |
| UL (Client) TCP packet with payload that belongs to the current Monitored TCP connection. | a) Clear current Monitored TCP connection profile. Clear Starting TCP Sequence Number and Current UL TCP ACK. Reset Current Unmonitored Volume.<br>b) Need to select a new Monitored TCP connection because we received UL TCP packet with payload. | a) Treat the Current Monitored TCP data transaction as complete.<br>b) If a valid ACK is received (ACK that was pending) for the current monitored session, it is updated to the Current UL TCP ACK and the current time is the time stamp of the final valid ACK.<br>c) (Current UL TCP ACK − (Starting TCP Sequence Number + IDLE to DOWNLOAD Threshold Volume)) is the DL TCP volume in the current period. Add this volume to the Total DL TCP Monitored Volume.<br>d) The end time was the time of the last valid acknowledgement which was recorded earlier. Add the current period's duration (end time − start time) to the Total DL Time duration.<br>e) Total Unmonitored Volume += Current Unmonitored Volume.<br>f) Clear Current Unmonitored Volume.<br>g) Change state to IDLE. |
| UL (Client) TCP packet with payload that does not belong to the current Monitored TCP connection (Monitored TCP connection exists). | Ignore. | Ignore. |
| UL (Client) packet with no payload that does not belong to the current Monitored TCP connection (Monitored TCP connection exists). | Ignore. | Ignore. |
| FIN, FIN-ACK, RST, RST-ACK from DL | Ignore. | a) Treat the Current Monitored TCP data transaction as complete.<br>b) (Current UL TCP ACK − (Starting TCP Sequence Number + IDLE to DOWNLOAD Threshold Volume)) is the DL TCP volume in the current period. Add this volume to the Total DL TCP Monitored Volume.<br>c) The end time was the time of the last valid acknowledgement which was recorded earlier. Add |

TABLE 3-continued

| | TCP Effective Throughput State | |
|---|---|---|
| Event | IDLE | DOWNLOAD |
| | | the current period's duration (end time − start time) to the Total DL Time duration.<br>d) Clear Current Unmonitored Volume.<br>e) Change state to IDLE. |
| FIN, FIN-ACK, RST, RST-ACK from UL | Ignore. | a) Treat the Current Monitored TCP data transaction as complete.<br>b) If a valid ACK (ACK that was pending) is received for the current monitored session, it is updated to the Current UL TCP ACK and the current time is the time stamp of the final valid ACK. Total Unmonitored Volume += Current Unmonitored Volume.<br>c) (Current UL TCP ACK − (Starting TCP Sequence Number + IDLE to DOWNLOAD Threshold Volume)) is the DL TCP volume in the current period. Add this volume to the Total DL TCP Monitored Volume.<br>d) The end time was the time of the last valid acknowledgement which was recorded earlier. Add the current period's duration (end time − start time) to the Total DL Time duration.<br>e) Clear Current Unmonitored Volume.<br>f) Change state to IDLE. |
| TCP connection timed out/swapped out. | Ignore. | a) Treat the Current Monitored TCP data transaction as complete.<br>b) (Current UT TCP ACK − (Starting TCP Sequence Number + IDLE to DOWNLOAD Threshold Volume)) is the DL TCP volume in the current period. Add this volume to the Total DL TCP Monitored Volume.<br>c) The end time was the time of the last valid acknowledgement which was recorded earlier. Add the current period's duration (end time − start time) to the Total DL Time duration.<br>d) Clear Current Unmonitored Volume.<br>e) Change state to IDLE. |
| PDP Session Closed/Deleted. | Ignore. | a) Treat the Current Monitored TCP data transaction as complete.<br>b) (Current UL TCP ACK − (Starting TCP Sequence Number + IDLE to DOWNLOAD Threshold Volume)) is the DL TCP volume in the |

TABLE 3-continued

| | TCP Effective Throughput State | |
|---|---|---|
| Event | IDLE | DOWNLOAD |
| | | current period. Add this volume to the Total DL TCP Monitored Volume.<br>c) The end time was the time of the last valid acknowledgement which was recorded earlier. Add the current period's duration (end time − start time) to the Total DL Time duration.<br>d) Clear Current Unmonitored Volume.<br>e) Change state to IDLE. |
| End of Sampling Interval | c) Report Total DL Volume, Total DL TCP Monitored Volume, Total DL Unmonitored Volume, Total DL Time Duration, Number_DL_Periods and Multiple_DL_TCP_Flag to the KMD.<br>d) Reset all flags and counters. | a) (Current UL TCP ACK − (Starting TCP Sequence Number + IDLE to DOWNLOAD Threshold Volume)) is the DL TCP volume in the current period. Add this volume to the Total DL TCP Monitored Volume.<br>b) The end time was the time of the last valid acknowledgement which was recorded earlier. Add the current period's duration (end time − start time) to the Total DL Time duration.<br>c) Report Total DL Volume, Total DL TCP Monitored Volume, Total DL Unmonitored Volume, Total DL Time Duration, Number_DL_Periods and Multiple_DL_TCP_Flag to the KMD.<br>d) Reset Total DL TCP Monitored Volume, Total DL Time Duration, Total DL Unmonitored Volume, Multiple_DL_TCP_Flag. Set Number_DL_Periods = 1.<br>e) Roll over the current monitored TCP connection details to the next sampling interval. Maintain the Monitored TCP profile and Start time. Start Time is the current period's End time to be used in the next sampling period. Current DL Unmonitored Volume is not reset. |

Figure 5:
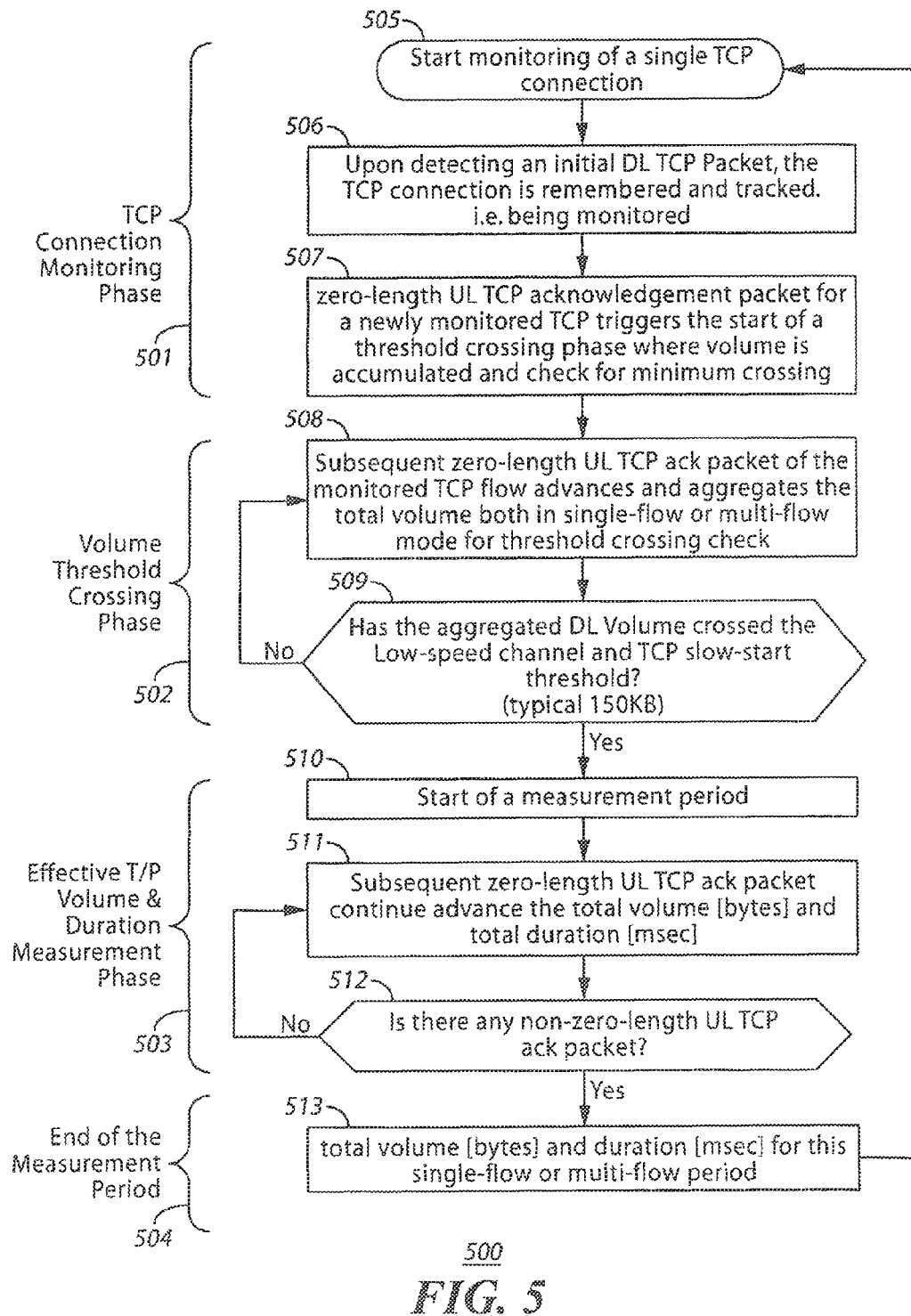
FIG. 5 comprises a flow diagram as configured in accordance with various embodiments of the invention.

As noted earlier, these teachings are very flexible and will accommodate a wide variety of alternative and/or otherwise embellished approaches. As a further illustration in these regards, FIG. 5 depicts a process 500 characterized by a TCP connection monitoring phase 501, a volume threshold crossing phase 502, an effective T/P volume and duration measurement phase 503, and an end of the measurement period phase 504.

The TCP connection monitoring phase 501 begins by starting 505 monitoring of a single TCP connection. At step 506 this process 500 provides for detecting initial downlink TCP packets and then monitoring the corresponding TCP connection (for example, by remembering and tracking that particular TCP connection). At step 507 the process 500 triggers the start of a threshold crossing phase upon detecting a zero-length uplink TCP acknowledgement packet for the newly-monitored TCP connection. Pursuant to this threshold crossing phase, data volume is accumulated and checked for minimum crossing.

The volume threshold crossing phase 502, at step 508, advances and aggregates the total volume (for both single flows or multiple flows) for subsequent zero-length uplink TCP acknowledgement packets of the monitored TCP connection. At step 509 the process 500 determines whether this aggregated downlink volume has crossed a threshold that represents, for example, exceeding the volume that might otherwise tend to correspond to a low-speed channel or a TCP slow-start. The value of this threshold can of course vary to suit the specifics of a given application setting. For many networks a value of about 150 KB will serve well in these regards.

When the aggregated volume has not yet exceeded this threshold, the foregoing step 508 continues. When the aggregated volume does exceed this minimum threshold, however, at step 510 this process 500 starts a measurement period and thereby begins the effective T/P volume and duration measurement phase 503.

At step 511 subsequent zero-length uplink TCP acknowledgement packets continue to advance the total volume (measured, here, in bytes) as well as the total duration of the measurement period (measured, here, in milliseconds). When the process 500 eventually detects (at step 512) a non-zero-length uplink TCP acknowledgement packet, the process 500 shifts to the end of the measurement period 504 and, at step 513, attends to the final aggregation of the total data volume and duration of the measurement period for this particular single-flow or multi-flow (as the case may be) measurement period.

So configured, this particular approach avoids permitting low-volume-only TCP connections from contributing to the overall aggregated metrics for a given end user, service component, or network. This, in turn, can again help to yield, ultimately, metrics regarding average throughput that better tend to reflect and gauge the actual perceived experience of the end user.

Those skilled in the art will appreciate that these teachings permit one to monitor, from a central network location (as opposed to from a mobile end user or near a radio tower), the TCP data flows of interest and to leverage specific TCP characteristics to effectively monitor all traffic (including non-TCP traffic) with respect to average throughput, and further that the described activities can occur in real time (or substantially in real time) as desired. This, in turn, can serve to locate network bottlenecks and enhance the ability for capacity planning.

The described approaches facilitate differentiating between user/application idle time and idle time caused by network buffering delay, retransmissions, duplicate acknowledgements, zero window sizes, and so forth. The former tends to refer to idle time between two distinct TCP data transactions during which a TCP end point is not required, obligated, or expected to send any new TCP messages. This can occur, for example, when an end user idles between two web page retrievals. Excluding the temporal influence of such idle time, in turn, aids in providing a more accurate and realistic view of the end-user's throughput experience.

For example, periods of time featuring little or no data volume would not be included in the average effective T/P measurements if due to: (1) the end user not requesting any data from the application server (when, for example, the end user takes time to read a web page after downloading that web page) or (2) an end-user application requests the server to pause sending additional data (as may occur, for example, when an end user pauses a streaming video and the enabling application, in turn, sends a "pause" request to stop the server from sending further streaming-video packets, per the non-zero-length UL ack scenario described above).

That said, durations of time featuring little or no data tend to be included in the average effective T/P measurement when due, for example, to: (1) network buffering delay and corresponding resultant traffic breakage; or (2) end user equipment performance or weak signaling problems that slow down the reception and/or acknowledgements of TCP traffic.

The above-described tracking of uplink acks allows these teachings to reliably distinguish such conditions from one another. Utilization, for example, of the zero-length TCP UL ack versus the non-zero length TCP UL ack as described above allows one to distinguish when low or no volume is likely attributable to end-user equipment performance or weak signaling problems (since the end-user client would send a request to the server comprising a zero-length TCP UL ack in such a case).

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As but one example in these regards, these disclosed approaches could be readily extended to specific TCP applications or to use with a TCP-based Open Systems Interconnection (OSI) layer 7 protocol. For instance, one could monitor Hyper-Text Transfer Protocol (HTTP)-based video streaming by focusing the disclosed approaches to the HTTP layer where uplink TCP acknowledgements are still tracked albeit with respect to only one specific TCP application.

We claim:

1. A method comprising:
   at a network monitoring apparatus in a communications network:
   detecting a plurality of Transmission Control Protocol (TCP) data flows in the communications network to at least one network-served end user, which TCP data flows are not instigated by the network monitoring apparatus, to provide detected data flows;
   measuring data throughput to the at least one network-served end user via the TCP data flows during the TCP data flows, wherein the measuring comprises aggregating data volume metrics for each of the plurality of TCP data flows;
   detecting uplink TCP acknowledgement packets from the at least one network-served end user;
   determining time variables that represent the detected TCP data flows by, at least in part, timestamping the detected uplink TCP acknowledgement packets; and
   calculating an average effective data throughput to the at least one network-served end user using the time variables, wherein the calculating comprises dividing the aggregated data volume metrics by an aggregated amount of time during which at least one of the plurality of TCP flows is flowing.

2. The method of claim 1 wherein detecting the plurality of TCP data flows comprises, at least in part, detecting downlink TCP packets.

3. The method of claim 1 wherein at least one of the TCP data flows comprises a TCP-based Open Systems Interconnection (OSI) layer 7 protocol-based TCP data flow.

4. The method of claim 1 wherein the detecting, measuring, and calculating all occur substantially in real time.

5. The method of claim 1 wherein, when the TCP data flows comprise, for a time, only a single TCP data flow:
   measuring data throughput to the at least one network-served end user via the TCP data flows during the TCP data flows comprises aggregating data volume metrics for the single TCP data flow from a beginning time that corresponds to a beginning of the single TCP data flow to an ending time that corresponds to an end of the single TCP data flow.

6. The method of claim 1 wherein, when the TCP data flows also comprise, for a time, at least a first TCP data flow that is contemporaneous with a second TCP data flow:
measuring data throughput to the at least one network-served end user via the TCP data flows during the TCP data flows comprises concurrently aggregating data volume metrics for both the first and the second TCP data flow from a beginning time that corresponds to the first TCP data flow to an ending time that corresponds to one of the first and second TCP data flows, whichever is later.

7. The method of claim 1 further comprising storing information regarding how many measurement periods were used to measure the data throughput.

8. The method of claim 1 wherein, when a non-TCP data flow for the network-served end user is flowing contemporaneously with at least one of the TCP data flows:
measuring data throughput to the at least one network-served end user by concurrently aggregating data volume metrics for both the non-TCP data flow and the at least one contemporaneous TCP data flow.

9. The method of claim 8 wherein measuring data throughput to the at least one network-served end user does not include aggregating data volume metrics for non-TCP data flows unless the non-TCP data flow is concurrent with a measured TCP data flow.

10. The method of claim 1 wherein:
measuring data throughput to the at least one network-served end user via the TCP data flows during the TCP data flows comprises measuring the data throughput for a plurality of discrete time periods.

11. The method of claim 10 wherein the plurality of discrete time periods are at least substantially temporally sequential.

12. The method of claim 1 wherein measuring data throughput to the at least one network-served end user via the TCP data flows during the TCP data flows comprises, at least in part, aggregating data throughput measurements over a predetermined window of time.

13. The method of claim 12 wherein aggregating data throughput measurements over a predetermined window of time comprises, at least in part, separately aggregating measurements for each of:

data-flow volume for solo TCP data flows to the network-served end user when a flow-monitoring duration is characterized as having only a single TCP data flow being provided to the network-served end user;

data-flow durations for solo TCP data flows to the network-served end user when a flow-monitoring duration is characterized as having only a single TCP data flow being provided to the network-served end user;

data-flow volume for multiple TCP data flows to the network-served end user when a flow-monitoring duration is characterized as having multiple TCP data flows concurrently being provided to the network-served end user;

data-flow durations for multiple TCP data flows to the network-served end user when a flow-monitoring duration is characterized as having multiple TCP data flows concurrently being provided to the network-served end user.

14. The method of claim 13 wherein separately aggregating measurements further comprises aggregating measurements regarding a number of measurement periods that are conducted during the predetermined window of time.

15. The method of claim 13 wherein a flow-monitoring duration is characterized as having multiple TCP data flows when the flow-monitoring duration begins with multiple TCP data flows.

16. The method of claim 12 wherein aggregating data throughput measurements over a predetermined window of time comprises using aggregated data throughput measurements obtained over a plurality of the predetermined windows of time to gauge the network-served end user's throughput experience.

17. The method of claim 12 wherein aggregating data throughput measurements over a predetermined window of time comprises using aggregated data throughput measurements obtained over a plurality of the predetermined windows of time to facilitate identifying average effects attributable to individual service delivery components of the communications network.

\* \* \* \* \*